United States Patent Office 3,778,458
Patented Dec. 11, 1973

3,778,458
LACTONE-SILICONE COMPOSITIONS
Edward Lewis Morehouse, New City, N.Y., assignor to Union Carbide Corporation, New York, N.Y.
No Drawing. Original application May 3, 1968, Ser. No. 726,588, now abandoned. Divided and this application Mar. 22, 1971, Ser. No. 127,009
Int. Cl. C07f 7/02, 7/18
U.S. Cl. 260—448.2 B    18 Claims

ABSTRACT OF THE DISCLOSURE

Novel lactone-silicone block copolymers containing a block of at least two siloxy units:

and a block of lactone units,

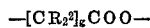

with or without units of the formula —DO— such as oxyalkylene units of the formula, $\{C_aH_{2a}O\}$, such copolymers being exemplified by polycaprolactone siloxanes containing the siloxy unit:

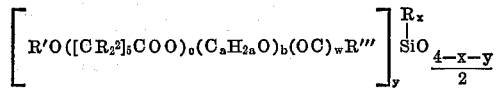

and novel polycaprolactone silanes having the formula:

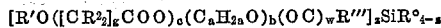

wherein R is selected from the class consisting of hydrogen, a monovalent hydrocarbon group free of aliphatic unsaturation and having 1 to 18 carbon atoms, and a divalent organic, preferably hydrocarbon, connecting group free of aliphatic unsaturation and having 2 to 18, preferably 2 to 12, carbon atoms bonded to silicon by a linkage selected from the class consisting of silicon to carbon bonds and silicon to oxygen to carbon bonds, at least one R being a divalent organic connecting group interconnecting a silicone block with a lactone block, R' is selected from the class consisting of hydrogen, a monovalent hydrocarbon group free of aliphatic unsaturation and having 1 to 18 carbon atoms, and an acyl group of the formula: R''C(O)— wherein R'' is selected from the class consisting of hydrogen and a monovalent hydrocarbon group free of aliphatic unsaturation and having 1 to 18 carbon atoms, R''' is a divalent hydrocarbon group free of aliphatic unsaturation and having 2 to 18 carbon atoms, (OC) is a carbonyl groups, the group $(OC)_wR'''$ having 3 to 18 carbon atoms, R° is selected from the class consisting of hydrogen, halogen, monovalent hydrocarbon free of aliphatic unsaturation, alkoxy and aryloxy groups and having no more than 18 carbon atoms; $R^2$ is selected from the class consisting of hydrogen and monovalent hydrocarbon groups free of aliphatic unsaturation and having 1 to 18 carbon atoms, —DO— is a divalent organic group derived from an epoxide by opening of the oxirane ring, w is an integer of 0 to 1; a is an integer of 2 to 10; b is an integer of 0 to about 100; c is an integer of 1 to about 100; d is an integer of 1 to 3; g is an integer of 5 to 6; x is an integer of 0 to 2; y is an integer of 1 to 3; z is an integer of 1 to 4; and x+y is an integer of 1 to 3. These polycaprolactone silicones are exceptionally useful as foam stabilizing agents, especially in the manufacture of polyurethane foams. Also disclosed are procedures for making the polycaprolactone silicones and polyurethane foams using the polycaprolactone silicone materials.

This application is a division of co-pending U.S. patent application Ser. No. 726,588, filed May 3, 1968, now abandoned.

This invention relates to novel compositions containing lactone-silicone block copolymers which are useful as surfactants and/or as foam stabilizers in the manufacture of foamed, cellular polyurethane materials. The invention is also directed to novel processes for making the lactone-silicone block copolymer compositions and to processes for making foamed, cellular polyurethane materials utilizing such compositions. Additionally, this invention is directed to novel alkenyl lactone compositions used in the manufacture of the above-mentioned lactone-silicone block copolymer compositions and to processes for making such alkenyl lactone compositions.

The term "copolymer," as used herein, is intended to include polymers of two or more different types of monomeric or polymeric polymerizants or reacting moieties.

The term "foam stabilizer," as used herein with reference to polyurethane resin foam formulations, means a material which has the two-fold properties of (a) helping to produce a foam in the formulation and (b) preventing collapse of the foam until the foamed product has developed sufficient gel strength for the foam to become self-supporting.

Included in this invention are hydrolytically stable block copolymers which provide many useful advantages. For example, such hydrolytically stable lactone-silicone block copolymers are useful as foam stabilizers and can be stored alone or mixed with other conventional components of a polyurethane foam formulation for long periods of time without undergoing any significant hydrolytic decomposition. This hydrolytic stability applies to both moisture in the air and water which may be present in the foam formulation. Hydrolytic stability is particularly important in those cases where the foam stabilizer must be in contact with both water and organic amine catalysts of the type conventionally used in urethane foam formulations, since it is well known that hydroxide ions derived from an organic base tend to catalyze hydrolysis. Another advantage of the hydrolytically stable lactone-silicone block copolymers of this invention is their lack of reactivity with the metal organic compounds conventionally used as catalysts in polyurethane foam formulations. The hydrolytically stable lactone-silicone block copolymers of this invention are also extremely efficient foam stabilizers and result in the production of foamed products even when used in amounts as small as 0.1 weight percent based on the total weight of the foam formulations. The hydrolytic stability of the hydrolytically stable lactone-silicone block copolymers included in this invention results from the fact that the organic moieties thereof are connected to the siloxane moieties through hydrolytically stable silicon-carbon bonds.

The copolymers of this invention are of the class that is known as "block" copolymers. Block copolymers are composed of at least two sections or blocks, at least one section or block composed of one type of unit or group (e.g., recurring siloxane groups as in the copolymers of this invention) and at least one other section or block composed of a different type of recurring units or groups (e.g., caprolactone units, —O(CH$_2$)$_5$CO—, with or without other divalent groups derived from 1,2-epoxides by opening of the oxirane ring, such as, oxyalkylene groups, as in the copolymers of this invention). Block copolymers can have linear, cyclic or branched (crosslinked) structures.

The siloxane blocks in the copolymers of this invention contain at least two siloxane groups that are represented by the formula:

(1) 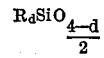

wherein R is selected from the class consisting of hydrogen, monovalent hydrocarbon radicals free of aliphatic unsaturation and having 1 to 18, preferably 1 to 12, carbon atoms, and a divalent organic, preferably hydrocarbon, connecting group free of aliphatic unsaturation and having 2 to 18, preferably 2 to 12, atoms bonded to silicon by a linkage selected from the class consisting of silicon to carbon bonds and silicon to oxygen to carbon bonds, at least one R being a divalent organic connecting group interconnecting a silicone block with a lactone block, and $d$ is 1 to 3. The radicals represented by R can be the same or different in any given siloxane group or throughout the siloxane block, and the value of $d$ in the various siloxane groups in the siloxane block can be the same or different. The divalent radicals represented by R link the siloxane block to the oxyalkylene block. Each siloxane block contains at least one group represented by Formula 1 wherein at least one radical represented by R is a divalent hydrocarbon radical. The siloxane block has a ratio of hydrocarbon radicals to silicon atoms from 1:1 to 3:1.

Illustrative of the monovalent hydrocarbon radicals that are represented by R in Formula 1 are the alkyl radicals (for example, the methyl, ethyl, isopropyl, octyl and dodecyl radicals); the aryl radicals (for example, the phenyl and naphthyl radicals); the aralkyl radicals (for example, the benzyl and the phenylethyl radicals); the alkaryl radicals, such as, the styryl, tolyl and n-hexylphenyl radicals, and the cycloalkyl radicals (for example, the cyclohexyl radical).

Illustrative of the divalent connecting radicals represented by R in Formula 1 are the divalent hydrocarbon radicals including alkylene radicals (such as, the methylene, ethylene, propylene, butylene, 2,2-dimethyl-1,3-propylene and decylene radicals), the arylene radicals (such as, the phenylene p,p¹-diphenylene radicals), and the alkarylene radicals (such as the phenylethylene radical). Preferably, the divalent radical is an alkylene radical containing from two to four, preferably three to four, successive carbon atoms. Siloxane groups containing divalent radicals as substituents are illustrated by groups having the formulas:

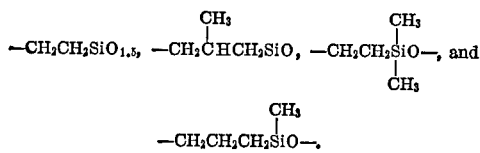

These divalent radicals are linked to a silicon atom of the siloxane block by a silicon-to-carbon bond as shown or by a silicon-to-oxygen-to-carbon bond and to an oxygen atom of the lactone block by a carbon-to-oxygen bond.

The siloxane block can contain siloxane groups that are represented by Formula 1 wherein either the same hydrocarbon or organic radicals are attached to the silicon atoms (e.g., the dimethylsiloxy, diphenylsiloxy and diethylsiloxy groups) or different hydrocarbon or organic radicals are attached to the silicon atoms (e.g., the methylphenylsiloxy, phenylethylmethylsiloxy and ethylvinylsiloxy groups).

The siloxane block in the copolymers useful in this invention can contain one or more types of siloxane groups that are represented by Formula 1 provided that at least one siloxane group has at least one divalent substituent. By way of illustration, only ethylenemethylsiloxy groups

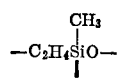

can be present in the siloxane block or the siloxane block can contain more than one type of siloxane group, e.g., the block can contain both ethylenemethylsiloxy groups and diphenylsiloxy or dimethylsiloxy groups, or the block can contain ethylenemethylsiloxy groups, diphenylsiloxy groups and diethylsiloxy groups.

The siloxane block contained in the copolymers useful in this invention can contain trifunctional siloxane groups (e.g., monomethylsiloxane groups, $(CH_3SiO_{1.5})$), difunctional siloxane groups (e.g., dimethylsiloxane groups, $(CH_3)_2SiO$—), monofunctional siloxane groups (e.g., trimethylsiloxane groups, $(CH_3)_3SiO_{0.5}$), or combinations of these types of siloxane groups having the same or different substituents. Due to the functionality of the siloxane groups, the siloxane block can be predominantly linear or cyclic or crosslinked or it can have combinations of these structures.

The siloxane block contained in the copolymers useful in this invention can contain organic chain terminating radicals, in addition to the monofunctional siloxane chain terminating groups encompassed by Formula 1. By way of illustration, the siloxane block can contain such terminating radicals as the hydroxyl radical, the aryloxy radicals (such as the phenoxy radical), the alkoxy radical (such as, the methoxy, ethoxy, propoxy and butoxy radicals), or the acyloxy radicals (such as the acetoxy radical).

The siloxane blocks preferably contain a total of from five to two hundred siloxane groups that are represented in Formula 1. That part of the average molecular weight of the copolymer that is attributable to the siloxane blocks can be as high as 50,000 but preferably it is from 220 to 20,000. If that part of the average molecular weight of the copolymer that is attributable to the siloxane blocks exceeds 50,000 or if the siloxane blocks contain a total of more than two hundred siloxane groups that are represented in Formula 1, the copolymers are usually not as useful, e.g., they may be too viscous for convenient use, in the urethane foam formulations of this invention.

A siloxane block can contain, among the groups represented by Formula 1, siloxane groups represented by the formula:

(1-a) 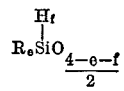

wherein R has the meaning defined in Formula 1, $e$ is 0 to 2, $f$ is 1 or 2 and $e+f$ is 1, 2 or 3.

The lactone units in the lactone or polylactone blocks of the novel copolymers each contain at least one unit, preferably at least four units, of the formula:

(2) 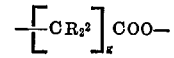

wherein $R^2$ is hydrogen or monovalent hydrocarbon as defined above and $g$ is an integer of 5 to 6. Illustrative of such lactone units are *epsilon*-caprolactone units, e.g., —[CH₂]₅COO—, monoalkyl *epsilon*-caprolactone units, e.g.,

—C(CH₃)H(CH₂)₄COO—,

—CH₂C(C₁₂H₂₅)H(CH₂)₃COO—, and the like, dialkyl *epsilon*-caprolactones, e.g.,

—C(C₂H₅)HC(C₂H₅)H(CH₂)₃COO—,

—CH₂C(C₃H₇)HCH₂C(CH₃)HCH₂COO— and the like, cycloalkyl, aryl and aralkyl *epsilon*-caprolactones, e.g.,

—(CH₂)₂C(C₆H₁₁)H(CH₂)₂COO—,

—(CH₂)₃C(C₆H₅)HCH₂COO—,

—C(CH₂C₆H₅)H(CH₂)₄COO— and the like wherein C₆H₁₁ is cyclohexyl, C₆H₅ is phenyl and —CH₂C₆H₅ is benzyl.

The lactone block can also contain one or more divalent organic units, (3) —DO— which is a divalent group derived from a 1,2-epoxide, such as 1,2-epoxycyclohexane, glycidol, 1,2-epoxybutane, 1,2-diisobutylene oxide, 2,3-diisobutylene oxide, butadiene dioxide, 1,2-epoxy-4-vinylcyclohexane, and the like, by opening of the oxirane ring, preferably, oxyalkylene units of the formula:

(3-a) $\text{\textemdash}(C_aH_{2a}O)\text{\textemdash}$ wherein $a$ is an integer of 2 to 10, preferably 2 to 4. Illustrative of the oxyalkylene groups are the oxyethylene, oxy-1,2-propylene groups and the like. The term "lactone block" herein includes blocks of only lactone units as well as blocks of lactone and oxyalkylene units and/or divalent units derived from 1,2-epoxides by opening the oxirane ring as explained above.

The lactone blocks in the copolymers of this invention can contain one or more of the various types of divalent organic and/or oxyalkylene groups represented by Formulas 3 and 3–a. By way of illustration, the lactone blocks can contain only *epsilon*-caprolactone groups or only monomethyl *epsilon*-caprolactone groups or both types of groups, or other combinations of the various types of lactone groups represented by Formula 2 with or without divalent organic and/or oxyalkylene groups of the same or different types as shown in Formulas 3 and 3–a.

The lactone blocks in the copolymers of this invention can contain such end radicals as the hydroxy radical, the aryloxy radicals (such as the phenoxy radical), the alkoxy radicals (such as, the methoxy, ethoxy, propoxy and butoxy radicals), and acyloxy radicals, such as, acetoxy, proionyloxy, butyryloxy radicals and the like. Also, a single radical can serve as a terminating radical for more than one lactone block. For example, the glyceroxy radical,

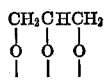

can serve as a terminating radical for three lactone chains.

Each lactone block preferably contains from four to thirty groups of Formula 2 and from four to thirty groups of Formulas 3 and/or 3–a, if present. That part of the average molecular weight of the copolymer that is attributable to the lactone blocks can vary from 114 [for —$(CH_2)_5COO$—] to 15,000, but preferably it is from 114 [for —$(CH_2)_5COO$—] to 9,000. Provided that each block contains at least one lactone group represented by Formula 2, the number of lactone groups and that part of the average molecular weight of the copolymer that is attributable to the lactone blocks is not critical, but those copolymers in which that part of the average molecular weight that is attributable to the lactone blocks exceeds 15,000 per block are usually less useful, e.g., may be too viscous for convenient use, in the urethane foam formulations of this invention.

The copolymers of this invention can contain siloxane blocks and lactone blocks in any relative amount. In order to possess desirable properties, the copolymer should contain from 5 parts by weight to 95 parts by weight of siloxane blocks and from 5 parts by weight to 95 parts by weight of lactone blocks per 100 parts by weight of the copolymer. Preferably, the copolymers contain 5 parts by weight to 50 parts by weight of the siloxane blocks and from 50 parts by weight to 95 parts by weight of the lactone blocks per 100 parts by weight of the copolymer.

The copolymers of this invention can contain more than one of each of the blocks and the blocks can be arranged in various configurations, such as, linear, cyclic or branched configurations. By way of illustration, the following classes of compounds are among the siloxane-lactone block copolymers useful in the formulations of this invention:

(A) Copolymers that contain at least one unit of the formula:

(4)
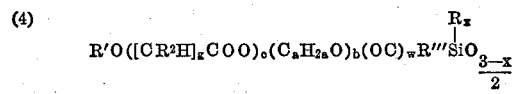

(B) Copolymers that contain at least one unit of the formula:

(5)
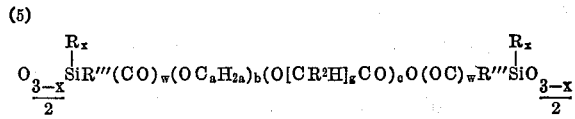

(C) Copolymers that contain at least one unit of the formula:

(6)
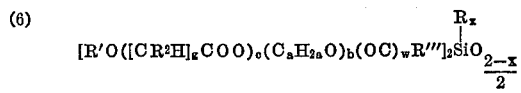

(D) Copolymers that contain at least one unit of the formula:

(7) $[R'O([CR^2H_g COO)_c(C_aH_{2a}O)_b(OC)_w R''']_3 SiO_{1/2}$

In Formulas 4 through 7, R, $R^2$, $a$, $e$, $f$ and $g$ are as defined above, R' is selected from the class consisting of hydrogen, a monovalent hydrocarbon group free of aliphatic unsaturation and having 1 to 18 carbon atoms such as illustrated above and an acyl group of the formula: R''C(O)— wherein R'' is selected from the class consisting of hydrogen and a monovalent hydrocarbon group free of aliphatic unsaturation and having 1 to 18 carbon atoms such as illustrated above, R''' is a divalent hydrocarbon group free of aliphatic unsaturation and having 2 to 18 carbon atoms, the group $(OC)_w R'''$ preferably having 3 to 18 carbon atoms, $b$ is an integer of 0 to about 100; $c$ is an integer of 1 to about 100; $w$ is an integer of 0 to 1; and $x$ is an integer of 0 to 2, preferably 1.

The monovalent hydrocarbon radicals represented by R in Formulas 4–7 can be saturated or can contain benzenoid unsaturation, but preferably are free of olefinic unsaturation. Illustrative of the monovalent hydrocarbon radicals represented by R are the linear aliphatic radicals (e.g., the methyl, ethyl and decyl radicals), the cycloaliphatic radicals (e.g., the cyclohexyl and the cyclopentyl radicals), the aryl radicals (e.g., the phenyl, tolyl, xylyl and naphthyl radicals), the aralkyl radicals (e.g., the benzyl and beta-phenylethyl radicals).

Preferably the R radical (included in the definition of R in Formulas 1 and 1–a above) contain from one to about twelve carbon atoms and the —DO— or —$C_aH_{2a}O$— radicals contin from two to about four carbon atoms. When the R' radical is a monovalent hydrocarbon radical free of aliphatic unsaturation or an acyl group as defined above, it preferably contains from one to about twelve carbon atoms.

Illustrative of the divalent hydrocarbon radicals represented by R''' in Formulas 4–7 are the alkylene radicals (e.g., the methylene, ethylene, 1,3-propylene, 1,4-butylene and 1,12-dodecylene radicals), the arylene radicals (e.g., the phenylene radical) and the alkarylene radicals (e.g., the phenylethylene radicals). R''' is preferably an alkylene radical containing at least two carbon atoms.

Illustrative of the radicals represented by R' in Formulas 4–7 are the saturated linear or branched chain aliphatic hydrocarbon radicals (e.g., the methyl, ethyl, propyl, n-butyl, tert-butyl and decyl radicals), the saturated cycloaliphatic hydrocarbon radicals (e.g., the cyclopentyl and cyclohexyl radicals), the aryl hydrocarbon radicals (e.g., the phenyl, tolyl, naphthyl and xylyl radicals), and the aralkyl hydrocarbon radicals (e.g., the benzyl and beta-phenylethyl radicals).

The composition of this invention include those that have the following formulas:

(I) $R_3SiO[R_2SiO]_r[R'O([CH_2]_5COO)_c$
$(C_2H_4O)_b C_3H_6SiRO]_t SiR_3$ wherein $r$ and $t$ are integers of sufficient value to provide 5 to 60 mol percent of the polycaprolactone siloxy units and 40 to 95 mol percent of the other siloxy units;

(II) $Me_3SiO[Me_2SiO]_r[CH_3COO([CH_2]_5COO)_c$
$(C_2H_4O)_bC_3H_6SiMeO]_tSiMe_3$ wherein $r$ is 10 to 150, $t$ is 1 to 25, $b$ is 10 to 100 and $c$ is 4 to 50 (e.g., wherein $r$ is 20, $t$ is 3 to 4, $b$ is 29 to 30 and $c$ is 9 to 10); and (III) $[CH_3COO([CH_2]_5COO)_c$
$(C_2H_4O)_bC_3H_6]_zSi(OEt)_{4-z}$ wherein the symbols are as defined above.

The following are representative of the hydrolytically stable siloxane-lactone block copolymers useful in this invention. In the formulas, Me represents methyl, Et represents ethyl, and Ph represents phenyl. Where the formula represents a unit of a polymer, it is understood that the polymer is terminated by radicals of the type described hereinabove.

(a)
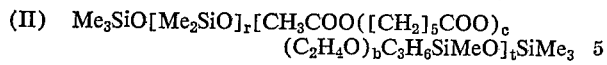
$(Me_3SiO)_2SiCH_2CH_2O(CH_2)_5COOC_4H_9$ (b)
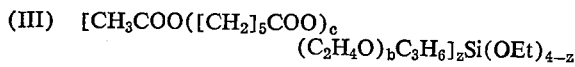
$C_4H_9C(O[CH_2]_5CO)_{11}OCH_2CH_2CH_2SiO(Me_2SiO)_{12}SiCH_2CH_2CH_3$
$\parallel$
$O$ (c) $Me_3SiO(Me_2SiO)_{8.5}[MeC(O[CH_2]_5OC)_{15}OC_3H_6SiMeO]_{3.5}SiMe_3$
$\parallel$
$O$ (d)
$Me_3SiO(Me_2SiO)_{5.1}[MeC(OC_2H_4)_{7.2}O([CH_2]_5COO)_{32}C_3H_6SiMeO]_{7.5}SiMe_3$
$\parallel$
$O$ (e)
$Me_3SiO(Me_2SiO)_{21}[BuC)OC_2H_4)_{18}([CH_2]_5CO)_{32}(OC_3H_6)_{14}OC_3H_6 + SiMeO]_{3.5}SiMe_3$
$\parallel$
$O$ (f)
$Me_3SiO(Me_2SO)_{8.5}[BuC(OC_3H_6)_{12.5}O([CH_2]_5COO)_{25}C_3H_6SiMeO]_{3.5} + SiMe_3$
$\parallel$
$O$ (g)
$Me_3SiO(Me_2SiO)_{21}[MeC(OC_2H_4)_{7.2}O([CH_2]_5COO)_{25}C_3H_6SiMeO]_{3.5} + SiMe_3$
$\parallel$
$O$ (h) $MeSiO(MeSiO)_{8.5}[MeCO([CH_2]_5COO)_{25}C_3H_6SiMeO]_{3.5}SiMe_3$
$\parallel$
$O$ The copolymers of this invention can be produced by an additional process that involves forming a mixture of a siloxane polymer containing a hydrogen-siloxy group (e.g., an HSiO group), a lactone polymer containing an alkenyloxy chain terminating group and a platinum catalyst and heating the mixture to a temperature sufficiently elevated to cause the siloxane polymer and the lactone polymer to react to produce the copolymer. The latter-mentioned reaction is an addition reaction that can be illustrated by the following equation:

(8) LACTONE—$(OR^6)_r$+[HSiO—]$_r$SILOXANE→
LACTONE[$OR^5$SiO—]$_r$SILOXANE wherein LACTONE denotes a polylactone block, SILOXANE denotes a siloxane block, $r$ is an integer having a value of at least 1 and preferably 1 to 4, $OR^6$ is an alkenyloxy radical (such as the vinyloxy and allyloxy radicals) or an alkenoyloxy radical (such as, acryloxy, methacrylyloxy radicals) and $R^5$ is an alkylene radical containing at least two successive carbon atoms. The addition process is applicable to the production of those copolymers of this invention containing a siloxane block that is linked to a polylactone block by an alkylene radical that has at least two successive carbon atoms (e.g., an ethylene, 1,2-propylene or 1,2-butylene group and the like). Platinum at a concentration of 0.001 to 0.050 weight percent based on the reactants is an especially useful catalyst. It can be used as chloroplatinic acid or as platinum supported on the gamma allotrope of alumina. Liquid organic compounds in which the starting polymers are mutually soluble, such as toluene, can be used in the addition process. The temperature employed can vary from 25° C. to 200° C.

The starting lactone polymers used in the addition process are terminated by one, two or more alkenyloxy or alkenoyloxy radicals. These alkenyloxy or alkenoyloxy radicals react to produce the divalent hydrocarbon radicals that link the lactone blocks to the siloxane blocks in the copolymer. When the starting lactone polymer contains only one end alkenyloxy or alkenoyloxy radical, it contains other end radicals, such as, hydroxyl, acyloxy, alkoxy or aryloxy radicals. In addition to the alkenyloxy or alkenoyloxy end-blocking radical or radicals, the starting lactone polymer contains at least one, preferably at least four, lactone groups represented by Formula 2.

The starting lactone polymer used in the addition process can be produced in several ways. An especially useful method for making the alkenyloxy or alkenoyloxy terminated lactone polymers is by the addition of the lactone, with or without an epoxide, e.g., alkylene oxide, to an aliphatically unsaturated hydroxyl organic compound, such as, allyl alcohol, methallyl alcohol, oleyl alcohol, acrylic acid, methacrylic acid, oleic acid, as more fully described hereinafter.

The siloxane polymers that are used as a starting material in producing the copolymers of this invention by the addition process contain at least two groups represented by Formulas 1 or 1-a, wherein R is a monovalent hydrocarbon radical or a hydrogen atom and $d$ has a value from 1 to 3. These siloxane polymers contain at least one group represented by Formulas 1 or 1-a where at least one group represented by R is a hydrogen atom.

The starting siloxane polymers used in the addition process can be produced by known processes. By way of illustration, a typical starting siloxane polymer can be produced by a process that involves forming a mixture of a methylhydrogensiloxane, hexamethyldisiloxane and an acidic equilibration catalyst (such as sulfuric acid) and stirring the mixture at about room temperature until the siloxanes equilibrate to produce a starting siloxane polymer having the formula $Me_3SiO(HSiMeO)_xSiMe_3$ wherein $x$ is an integer of at least one.

The relative amounts of the starting materials used in the addition process are not narrowly critical. Amounts of the starting materials that provide stoichiometric amounts of hydrogensiloxane groups and alkenyloxy and/or alkenoyloxy radicals are preferred although other amounts can be used. When other than stoichiometirc amounts of these groups are present, the copolymer produced can contain unreacted hydrogensiloxy and alkenyloxy and/or alkenoyloxy groups. The presence of such unreacted groups in the copolymer can at times be desirable, e.g., when it is desired to have reactive sites in the copolymer so that the copolymer can be reacted with other materials.

Siloxane-lactone copolymers can be produced by the addition processes described herein from starting siloxane polymers and starting lactone polymers containing other groups in addition to those indicated above. By way of illustration, copolymers can be produced by the addition process from (a) the siloxanes described above as useful in the addition process and (b) alkenyloxy and/or alkenoyloxy terminated lactone polymers that contain groups derived from organic compounds containing three or more hydroxyl substituents. As a further illustration, copolymers can be produced from starting siloxanes containing a polyvalent hydrocarbon group that is attached to two or more siloxane groups by carbon-to-silicon bonds.

Starting lactone polymers that contain groups derived from organic compounds containing three or more hydroxyl substituents can be produced by employing organic compounds containing three or more hydroxyl substituents as starter, in the reaction that produces the polymer. Illustrative of such organic compounds containing three or more hydroxyl substituents are glycerine; 1,2,6-hexanetriol; 1,3,5-hexanetriol; succinic acid; trimellitic acid, trimethylolmethane, and trimethylolethane. Copolymers produced from lactone polymers having units derived from such polyhydroxy compounds possess additional crosslinking due to the presence of the group derived from the polyhydroxy compound.

Starting siloxane polymers containing hydrocarbon groups that are attached to two or more siloxane groups by carbon-to-silicon bonds can be produced from poly(alkoxysilyl)alkanes by known processes. By way of illustration, poly(alkoxysilyl)alkanes, such as, bis(ethoxysilyl)ethane, tris(triethoxysilyl)butane or tris(triethoxysilyl)hexane can be mixed with an alkoxyhydrogensilane radical and other alkoxysilanes and the mixture processed according to known hydrolysis-and-equilibration processes to produce the starting siloxane polymer. The starting siloxane polymer can then be used in producing siloxane-lactone copolymers by the addition process.

Included in this invention are compositions of matter comprising caprolactone silicone compounds selected from the class consisting of polymers containing from 1 to 100 mol percent of siloxy units (A) of the average formula:

(9) 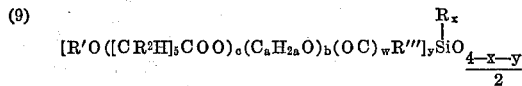

and 0 to 99 mol percent of siloxy units (B) of the formula:

(10) 

and silanes having the average formula:

(11) $[R'O([CR^2H]_5COO)_c(C_aH_{2a}O)_b(OC)_wR''']_zSiR°_{4-z}$ wherein $R^3$ is selected from the class consisting of hydrogen and monovalent hydrocarbon groups free of aliphatic unsaturation and having 1 to 18 carbon atoms, $R'$ is selected from the class consisting of hydrogen, monovalent hydrocarbon groups free of aliphatic unsaturation and having 1 to 18 carbon atoms and acyl groups of the formula: $R''C(O)$— wherein $R''$ is selected from the class consisting of hydrogen and monovalent hydrocarbon groups free of aliphatic unsaturation and having 1 to 18 carbon atoms, $R'''$ is a divalent hydrocarbon group, the group $(OC)_wR'''$ having 3 to 8 carbon atoms, $R°$ is selected from the class consisting of hydrogen, monovalent hydrocarbon groups free of aliphatic unsaturation, alkoxy and aryloxy groups having no more than 18 carbon atoms; $R^2$ is selected from the class consisting of hydrogen and monovalent hydrocarbon groups free of aliphatic unsaturation, (OC) is a carbonyl group; $w$ is an integer of 0 to 1; $a$ is an integer of 2 to 4; $b$ is an integer of 0 to about 100; $c$ is an integer of 1, preferably 4, to about 100; $d$ is an integer of 0 to 3; preferably 2; $x$ is an integer of 0 to 2, preferably 1; $y$ is an integer of 1 to 3; preferably 1; $z$ is an integer of 1 to 4; and $x+y$ is an integer of 1 to 3, preferably 2.

The caprolactone-silicone compounds containing siloxy units of Formula 9 with or without units of Formula 10 are produced by reacting, in the presence of a platinum catalyst, a monoalkenyl caprolactone composition of the average formula:

(12) $(R')_pO[(CR_2^2)_5COO]_c[C_aH_{2a}O]_b(OC)_w(R^4)_{2-p}$ wherein $R'$, $R^2$, $a$, $b$, $c$, and $w$ are as defined above and $R^4$ is a monovalent organic group having aliphatic unsaturation and preferably is a monovalent olefinically unsaturated hydrocarbon group, such as alkenyl, having 2 to 18, preferably 3 to 8 carbon atoms, and $p$ is an integer of 0 to 1, and a hydrosiloxane compound having 1 to 100 mol percent of hydrosiloxy units of the formula:

(13) 

and 0 to 99 mol percent of siloxy units of the formula:

(14) 

wherein R, $d$, $x$ and $y$ are as defined above in respect for Formulas 9 and 10. About one mol of said monoalkenyl caprolactone composition per siloxanic hydrogen atom of said hydrosiloxane is employed. The same range of reaction conditions as described for the addition process (Equation 8) is employed.

In like manner, the caprolactone silanes of Formula 11 are produced by reacting, in the presence of a platinum catalyst, a hydrosilane of the formula,

(15) $H_zSiR°_{4-z}$ wherein R° and z are as defined above in respect for Formula 11 with a monoalkenyl caprolactone composition of Formula 12, using about one mol of said monoalkenyl caprolactone composition per silanic hydrogen atom of said hydrosilane.

The olefinically unsaturated caprolactone compositions of this invention are represented by the Formula 12. As pointed out above, the monoalkenyl lactone compositions are produced by the addition of a lactone with or without one or more alkylene oxides to an olefinically unsaturated alcohol or carboxylic acid, e.g., an alkenol or alkenoic acid to form the hydroxy-terminated, alkenyl-terminated lactone polymer. The addition reaction can be carried out in accordance with any of the well known procedures for reacting lactones with hydroxy-containing starters, e.g., the procedures described in U.S. Pat. Nos. 2,933,478; 2,990,379; and 3,169,945. Of course, when an alkylene oxide, usually gaseous in the lower molecular weight ranges, is also employed as a reactant suitable procedures for handling gaseous reactants are necessary. For example, the procedures taught by any of the U.S. Pat. Nos. 1,633,927; 2,448,664; 2,425,755; 2,425,845; 2,213,477 and many others can be used.

In general, when an alkylene oxide is employed as a reactant along with a lactone, the alkenol or alkenoic acid starter preferably is placed in an autoclave or other high-pressure vessel along with catalytic amounts of a suitable catalyst, such as, sodium hydroxide, potassium hydroxide, other alkali metal hydroxides, sodium, other alkali metals, sodium alkoxide, e.g., sodium methoxide, sodium butoxide, etc., potassium alkoxide, other alkali metal alkoxides, alkali metal allylates, e.g., potassium allylate, potassium salts of allyl polyethers, stannous alkanoates, e.g., stannous octoate, or any other suitable oxyalkylation catalyst. The lactone chain is subject to attack and cleavage under excessive alkaline conditions and the use of excessive amounts should be avoided to avoid damage to the lactone chain. Catalysts such as potassium allylate and potassium salts of allyl polyethers do not form an inert diluent upon oxyalkylation but contribute to the amount of active monoallyl polyether produced. A mixture of lactone and alkylene oxide is then injected into the starter and basic catalyst and, the reaction being exothermic, the temperature increases, and preferably is controlled at 70 to 110° C. Because the alkylene oxides are normally gaseous materials, pressure is controlled, preferably at 60 to 70 p.s.i. The lactone-alkylene oxide mixture is preferably injected over a period of time until the monoalkenyl lactone-polyoxyalkylene composition of the desired average molecular size is obtained. The rate of injection can be regulated to control the pressure and temperature within the autoclave.

If all reactants are of low to moderate volatility, such as in the preparation of allyl diglycol started polycaprolactone, atmospheric pressures can be used. Stannous octoate catalyst permits the use of reaction temperatures of 100 to 200° C. and in small but effective amounts, e.g., about 0.002 weight percent Sn does not appear to interfere with subsequent SiH addition reactions.

When it is desired to produce a monoalkenyl lactone-polyoxyalkylene composition having lactone units and oxyalkylene units in random distribution, the lactone and alkylene oxide are either first mixed and then injected or are separately injected simultaneously. When it is desired to produce a composition having blocks of lactone units and blocks of oxyalkylene units, the lactone is separately injected to produce a block of the desired size and the alkylene oxide is separately injected to produce its block of the desired size. This procedure can be repeated to produce more than two such blocks, as desired.

The proportions of alkenol starter, lactone, and alkylene oxide, if used, can be varied, as desired, to produce alkenyl lactone compositions of the desired average molecular weight. The resulting compositions comprise mixtures of monoalkenyl lactone compounds containing different amounts of combined lactone and alkylene oxide, if used, and thus having different molecular weights from molecule to molecule. Formulas of monoalkenyl lactone compositions given herein represent average compositions.

Alkenols employed in the present invention to prepare the monoalkenyl lactone compositions include allyl alcohol, 3-buten-1-ol, 3-buten-2-ol, 1-penten-3-ol, 4-penten-1-ol, 4-penten-2-ol, 2-methyl-4-penten-2-ol, 2-methyl-3-penten-2-ol, 1-hexen-3-ol, 3-hexen-1-ol, 4-methyl-1-hepten-4-ol, 3-ethyl-5-hexen-3-ol, 3-cyclooctene-1-ol, 4-cyclooctene-1-ol, 3-cyclohexen-1-ol, and the like, allyl alcohol and other alkenols having the unsaturated group in a terminal position being preferred. Alkenoic acids employed herein include acrylic acid, vinylacetic acid, oleic acid and the like, acids having the unsaturated group in a terminal position being preferred. Alkylene oxides are those of the formula $C_aH_{2a}O$ wherein $a$ is an integer of 2 to 4, preferably 2 to 3, and include ethylene oxide, 1,2-propylene oxide, 1,2-butylene oxide, and mixtures thereof, ethylene oxide, 1,2-propylene oxide and mixtures thereof being preferred.

The lactone used as a starting material may be any lactone, or combination of lactones, having six or seven carbon atoms, for example from six to eight carbon atoms, in the ring and at least one hydrogen substituent on the carbon atom which is attached to the oxy group in said ring. In one aspect, the lactone used as starting material can be represented by the general formula:

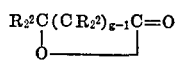

in which $g$ is at least five, for example, from five to six and $R^2$'s are substituents selected from the group consisting of hydrogen, alkyl, cycloalkyl, alkoxy and single ring aromatic hydrocarbon radicals. Lactones having five or less carbon atoms in the ring are considered unsuitable for the purposes of the invention because of the tendency that polymers thereof have to revert to the monomer, particularly at elevated temperature.

The lactones preferred in this invention are the *epsilon*-caprolactones having the general formula:

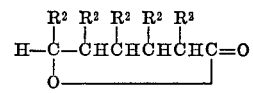

wherein at least one of the $R^2$'s is hydrogen and the remainder are hydrogen, alkyl, cycloalkyl, alkoxy or single ring aromatic hydrocarbon radicals, none of the substituents contain more than about twelve carbon atoms, and the total member of carbon atoms in the substituents on a lactone ring does not exceed about twelve. Unsubstituted *epsilon*-caprolactone, in which all the $R^2$'s are hydrogen, is derived from 6-hydroxyhexanoic acid. Substituted *epsilon*-caprolactones, and mixtures thereof, are available by reacting a corresponding substituted cyclohexanone with an oxidizing agent such as peracetic acid. The cyclohexanones may be obtained from substituted phenols or by other convenient synthetic routes.

Among the substituted *epsilon*-caprolactones considered most suitable for the purposes of the invention are the various monoalkyl *epsilon*-caprolactones, such as, the monomethyl-, monoethyl-, monopropyl-, monoisopropyl-, etc. to monododecyl *epsilon*-caprolactones; dialkyl *epsilon*-caprolactones in which the two alkyl groups are substituted on the same or different carbon atoms, but not both on the *epsilon* carbon atom; trialkyl *epsilon*-caprolactones in which two or three carbon atoms in the lactone ring are substituted, so long as the *epsilon* carbon atom is not substituted, alkoxy *epsilon*-caprolactones, such as, methoxy and ethoxy *epsilon*-caprolactones; and cycloalkyl, aryl, and aralkyl *epsilon*-caprolactones, such as, cyclohexyl, phenyl and benzyl *epsilon*-caprolactones.

The above procedure results in hydroxy-terminated, monoalkenyl lactone compositions. If it is desired to cap these materials with R' groups, e.g., alkyl, aryl or acyl groups, i.e., replace the hydroxy terminating group with R'O— groups, e.g., alkoxy, aryloxy or acyloxy groups, any of the well known capping procedures which do not require the use of excessively alkaline conditions can be employed. For example, the acyl-capped materials, i.e., where R' is acyl, are conveniently prepared by reaction of the hydroxy-terminated material with the desired carboxylic acid anhydride in a conventional esterification. The alkoxy-capped and aryloxy-capped materials, i.e., where R' is alkyl or aryl, are conveniently prepared by reaction of diazo hydrocarbons including diazoalkanes, such as diazoethane, with the hydroxy-terminated material under conditions conventional for such reactions.

The monoalkenyl lactone compositions produced by the addition of the lactone, with or without the alkylene oxide to an olefinically unsaturated alcohol or carboxylic acid, e.g., an alkenol or alkenoic acid, are characterized by the absence of materials containing more than one olefinically unsaturated group per molecule. As such these compositions are extremely well suited as starting materials for the production of compositions in which crosslinking is not desired.

As pointed out hereinbefore, the siloxane block or silicon atom and the lactone block are interconnected by the divalent connecting group R which can be connected to silicon of the siloxane block by means of a silicon-to-oxygen-to-carbon linkage. Block copolymers and polycaprolactone silanes of this type can be prepared by reacting a hydrosiloxane or hydrosilane of the type described in respect to Formulas 13, 14 and 15 with a hydroxy-terminated caprolactone composition in the presence of a catalyst such as zinc chloride or chloroplatinic acid as generally described in U.S. Pat. No. 2,967,171.

The reaction can be illustrated by the following equation:

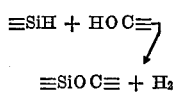

wherein

≡SiH represents the hydrosiloxane or hydrosilane,
HOC≡ represents the hydroxy-terminated caprolactone, and
≡SiOC≡ represents the block copolymer or polycaprolactone silane.

Reaction conditions can be the same as for the addition reaction hereinbefore described.

The hydroxy-terminated caprolactone compositions useful in this reaction have the formula:

wherein R', R², R''', a, b, c and w are as defined above and are produced by the addition reaction of a lactone and an alkylene oxide, if used, (1) to water, when producing a composition having two hydroxyl groups, one on each end and wherein w is 0; or (2) to an alkanol, R'OH, such as, ethanol, butanol, methanol, stearyl alcohol, octanol and the like, when producing a composition wherein w is 0 and R' is alkyl; or (3) to an alkanediol, HOR'''OH, such as, ethylene glycol, 1,2-propylene glycol, 1,4-butanediol and the like, when producing a composition wherein w is 0, R' is hydrogen and R''' is alkylene; or (4) to an alkanoic acid, such as, acetic acid, hexanoic acid, octanoic acid, stearic acid and the like, when producing a composition wherein w is 0 and R' is alkanoyl; or (5) to a hydroxy alkanoic acid, HOOCR'''OH, such as, lactic acid, glycollic acid, mandelic acid, gamma-hydroxybutyric acid, 15-hydroxypentadecylic acid and the like, when producing a composition wherein w is 1. The reaction conditions described hereinbefore for producing the olefinically unsaturated caprolactone compositions can be used in the production of hydroxy-terminated caprolactone compositions described above. For example, the procedures described in U.S. Pats. Nos. 2,933,478, 2,990,379, and 3,169,945 can be used for reacting the lactones with the hydroxy-containing starters. When gaseous reactants such as the alkylene oxides are employed suitable procedures for handling gaseous reactants are necessary as disclosed in U.S. Pats. Nos. 2,448,664, 2,425,845, 2,425,755, 2,213,477 and 1,633,927. Conventionally the reaction of such gaseous reactants is carried out under pressure in suitable equipment such as an autoclave.

The lactone-siloxane block copolymers produced herein demonstrate excellent surfactant properties. They are outstanding as emulsifiers and detergents in aqueous systems and are useful as profoamers and foam stabilizers in the manufacture of polyurethane foams, especially those of the rigid and semi-rigid type. The extraordinarily low viscosities of the linear novel lactone-siloxane block copolymers in aqueous systems permit them to be easily handled and readily mixed with other components to provide uniform reaction mixtures within the very short times before substantial reaction of the polyol and isocyanate occurs and thus result in more uniform foam products.

The polyurethane foams are produced by reacting a polyol and an organic polyisocyanate. The mixture is foamed in the presence of a catalyst and foam stabilizer, a lactone-siloxane block copolymer of the present invention, by means of a blowing agent, such as, water, a fluorocarbon or other inert gas, or mixtures thereof.

Many organic polyisocyanates can be employed for this purpose, including 2,4-tolylene diisocyanate, 2,6-tolylene diisocyanate, crude tolylene diisocyanate, bis(4-isocyanatophenyl)methane, polyphenylmethylene polyisocyanates that are produced by phosgenation of aniline-formaldehyde condensation products, dianisidine diisocyanate, tolidine diisocyanate, xylylene diisocyanate, naphthalene diisocyanate, hexamethylene diisocyanate, bis(2-isocyanatoethyl) fumarate, bis(2-isocyanatoethyl) carbonate, and many other organic polyisocyanates that are known in the art, such as those that are disclosed in an article by Siefken, Ann., 562, 75 (1949). In general, the aromatic polyisocyanates are preferred because of their greater reactivity.

In producing the polyurethane foams according to this invention, one or more polyols are employed in the reaction with the organic polyisocyanate. Such polyols that are employed are exemplified by the following classes of compositions:

(a) Polyoxyalkylene polyols including alkylene oxide adducts of, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactone alpha-methylglucoside alpha-hydroxyalkylglucoside, ammonia, triethanolamine, triisopropanolamine, ethylenediamine, diethylenetriamine, novolac resins, phosphoric acid, benzenephosphoric acid, polyphosphoric acid such as tripolyphosphoric acid and tetrapolyphosphoric acid, phenol-aniline-formaldehyde ternary condensation products, aniline-formaldehyde condensation products, and the like, are useful. The alkylene oxides employed in producing polyoxyalkylene polyols normally have from 2 to 4 carbon atoms. Propylene oxide and mixtures of propylene oxide with ethylene oxide are preferred.

(b) Polyesters of polyhydric alcohols and polycarboxylic acid such as those prepared from an excess of ethylene glycol, propylene glycol, 1,1,1-trimethylolpropane, glycerol, or the like reacted with phthalic acid, adipic acid, and the like, are useful polyols.

(c) Lactone polyols prepared by reacting a lactone such as epsilon-caprolactone or a mixture of epsilon-caprolactone and an alkylene oxide with a polyfunctional initiator such as a polyhydric alcohol, an amine, or an amino-alcohol, are also useful.

(d) Phosphorus-containing derivatives such as tris(dipropylene) glycol phosphite and other phosphites are useful in polyurethane foams.

The foregoing are merely illustrative of the many polyols that are employed in producing the polyurethane foams of the invention.

The polyol or polyol mixture employed can have hydroxyl numbers which vary over a wide range. In general, the hydroxyl numbers of the polyols employed in the invention can range from about 20, and lower, to about 1000, and higher, preferably from about 30 to about 800, and more preferably, from about 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

wherein

OH = hydroxyl number of the polyol
f = average functionality, that is, average number of hydroxyl groups per molecule of polyol
M.W. = average molecular weight of the polyol.

The exact polyol employed depends upon the end-use of the polyurethane foam. The molecular weight and the hydroxyl number are selected properly to result in flexible, semi-flexible, or rigid foams. The polyol preferably possesses a hydroxyl number of from about 200 to about 1000 when employed in rigid foam formulations, from about 50 to about 250 for semi-flexible foams, and from about 20 to about 70 or more when employed in flexible foam formulations. Such limits are not intended to be restrictive, but are merely illustrative of the large number of possible combinations of the polyols that can be employed.

The foamed products can be produced, for example, by the conventional one-shot technique wherein all of the reactants are reacted simultaneously with the foaming operation. Also, the quasi-prepolymer technique can be used to produce foams. In this technique, the isocyanate is first reacted with a portion of the polyol to give a product having a high percentage of free —NCO groups (e.g., from 20 to 50 percent), and this product is subsequently foamed by reaction with polyol and foaming agent. The conventional prepolymer technique is also useful.

The amount of polyisocyanate employed will vary slightly depending upon the nature of the polyurethane being prepared. In general, the total —NCO equivalent to total active hydrogen equivalent (i.e., hydroxyl plus water, if water is present) should be such as to provide a ratio of 0.8 to 1.2 equivalents of —NCO per equivalent of active hydrogen, and preferably a ratio of about 1.0 to 1.1 equivalents of —NCO per reactive hydrogen.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are water and certain halogen-substituted aliphatic hydrocarbon which have boiling points between about —40° C. and 70° C., and which vaporize at or below the temperature of the foaming mass. Illustrative are, for example, trichloromonofluoromethane, dichlorodifluoromethane, dichloromonofluoromethane, dichloromethane trichloromethane, bromotrifluoromethane, chlorodifluoromethane, chloromethane, 1,1-dichloro-1-fluoroethane, 1,1-difluoro-1,2,2 - trichloroethane, chloropentafluoroethane, 1-chloro-1 - fluoroethane, 1 - chloro - 2 - fluoroethane, 1,1,2 - trichloro - 1,2,2 - trifluoroethane, 2 - chloro - 1,1,1,2,3,3,4,4,4 - nonafluorobutane, hexafluorocyclobutene, and octafluorocyclobutane. Other useful blowing agents include low-boiling hydrocarbons such as, butane, pentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N,N'-dimethyldinitrosoterephthalamide.

The amount of blowing agent used will vary with the density desired in the foamed product. In general, it may be stated that for 100 grams of reaction mixture containing an average isocyanate/reactive hydrogen ratio of about 1:1, about 0.005 to 0.3 mol of gas is used to provide densities ranging from 30 to 1 pounds per cubic foot, respectively.

Catalysts can be employed in the reaction mixture for accelerating the isocyanate-reactive hydrogen reaction. Such catalysts include a wide variety of compounds. Among the most useful catalysts are the tertiary amines and the organic tin compounds. Specific illustrative tertiary amines include N-methylmorpholine, N-ethylmorpholine, N,N,N',N' - tetramethyl - 1,3 - butanediamine, N,N-dimethylethanolamine, 1,4 - diazabicyclo[2.2.2]octane, bis-[2-(N,N - dimethylamino)ethyl]ether, and the like. Useful organic tin compounds include stannous octoate, stannous acetate, stannous oleate, dibutyltin diacetate, dibutyltin dilaurate, and the like. Many combinations of catalysts can be employed. For instance, it is useful to employ one or two tertiary amines in combination with stannous octoate (in making flexible foams) or dibutyltin dilaurate (in making rigid foams). The catalyst is employed in catalytic amounts, such as from about 0.05 weight percent to about 6 weight percent, based on weight of polyol.

The amount of the novel siloxane composition employed as a foam stabilizer in the formulations of this invention can vary over wide limits from about 0.1 weight percent to 10 weight percent or greater. [Weight percentages are based on the total weight of the foam formulation, that is, the polyether, isocyanate, catalyst, water (if present) and siloxane composition foam stabilizer.] There is no commensurate advantage to using amounts of siloxane composition foam stabilizer greater than about 10 weight percent. Preferably, the amount of novel siloxane composition present in the foam formulations varies from about 0.5 weight percent to about 2.0 weight percent.

An excellent summary of urethane polymer chemistry and technology is found in the text by Saunders and Frisch, "Polyurethanes: Chemistry and Technology," Interscience Publishers, New York. Part I, "Chemistry," was published in 1963 and Part II, "Technology," in 1964. The teachings of these texts and the teachings of British Pat. 1,015,611 can be employed in the manufacture of polyurethane foams according to this invention.

Aqueous solutions of the novel siloxane compositions exhibit very low viscosities and are useful in a variety of applications, e.g., the production of treating baths in the textile industries, in wetting a wide variety of substrates including cotton, synthetic fibers (e.g., Fortrel, Dacron, Kodel, etc.), blends of cotton and synthetic fibers, etc.; in the production of emulsions for use in making polishes and waxes for floors, automobiles, furniture, etc.; in the production of cleaning solutions and so on. Such aqueous solutions can contain as little as 0.01 weight percent and up to 40% or the solubility concentration of the novel siloxane composition; however, in the usual case, amounts of 0.1 to 5 weight percent are adequate to provide the surfactant effects desired. The aqueous solutions can contain other water-soluble or water-miscible solvents such as lower alkanols including methanol, ethanol, propanol, isopropanol and t-butanol for a variety of purposes, including to promote greater solubility of other components of the solution.

In addition, the novel lactone-silicon compositions of this invention which are normally solid are useful as anti-blocking agents in a wide variety of plastics such as polyethylene.

The following examples are presented. All parts and percentages are by weight, all temperatures are on centigrade scale, Me means methyl, Et means ethyl, Oct means octyl or octoate.

EXAMPLE 1

Preparation of allyl started caprolactone/oxyethylene polyester-polyether

An allyl started caprolactone/oxyethylene copolymer was prepared using 18.0 g. of allyl alcohol, dried over 4A Molecular Sieve, 1.75 g. of 85% KOH pellets, 638 g. of epsilon-caprolactone and 344 g. of ethylene oxide. To a nitrogen-purged three liter steel autoclave was added the dry allyl alcohol and potassium hydroxide catalyst. Caprolactone and ethylene oxide were mixed in another autoclave and injected into the catalyst and starter over a period of about 24 hours, while maintaining the pressure at 60–70 p.s.i. and the temperature at 100–110° C. The resultant polyester was neutralized by acidification with aqueous hydrochloric acid and subsequent additions of sodium bicarbonate to neutralize excess hydrochloric acid. Toluene was added and the mixture sparged with nitrogen to 130° C. and finally filtered. The neutralized polyether had an average composition of

EXAMPLE 2

Preparation of allyl diglycol-polycaprolactone polyester-polyether

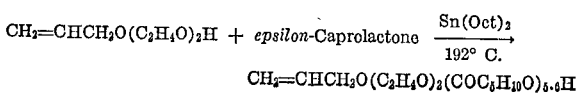

Allyl diglycol (28.0 g.) and *epsilon*-caprolactone (121.8 g.) were placed in a 250 ml. 3-neck flask equipped with a nitrogen sparging tube. The mixture was heated to 92° C. and sparged for 2 hours to remove any water present. Stannous octoate (.006 g.) was then added, the sparge was removed, and the temperature raised to 192° C. under a nitrogen blanket. After heating for 5 hours, the reaction was allowed to cool to yield the product melting at 36–39° C. and having the average composition shown above.

EXAMPLE 3

Acetoxy capping of polyester-polyether

A polyester-polyether of average composition $$CH_2=CHCH_2O(C_2H_4O)_{29}(COC_5H_{10}O)_9H$$

as prepared in Example 1 (500 g., 0.19 mol OH) and acetic anhydride (78.2 g., 0.77 mol) were mixed in a flask equipped with stirrer, thermometer, Friedrichs condenser and heating mantle. The reactants were heated for 4 hours at 130° C. The residual acetic anhydride was removed by sparging at 130° for three hours. The acetoxy-capped allyl polyester-polyether had the average composition $$CH_2=CHCH_2O(C_2H_4O)_{29}(COC_5H_{10}O)_9OCCH_3$$

It had the following properties:

Viscosity, cstk. _____ 3050
Bromine No. _____ 4.43
Percent OH _____ 0.04

EXAMPLE 4

Preparation of polycaprolactone siloxane

A silicone fluid of average composition $$Me_3SiO(Me_2SiO)_{20}(MeHSiO)_{3.2}SiMe_3$$

(9.5 g., 0.016 mol SiH), an allyl-endblocked polyester of average composition $$CH_2=CHCH_2O(C_2H_4O)_{29}(COC_5H_{10}O)_9OCCH_3$$

as prepared in Example 3 (64.6 g., 0.019 mol C=C) and toluene (100 ml.) were stirred and heated under nitrogen to 85° C. Chloroplatinic acid (55 p.p.m. of Pt.) was added dropwise over a period of 3 hours until an alcoholic potassium hydroxide test showed no silanic hydrogen remaining. Sodium bicarbonate (5 g.) was added and stirred. After cooling, the solution was filtered and sparged. The average composition of the resulting product was:

$$Me_3SiO(Me_2SiO)_{20}[CH_3CO(OC_5H_{10}CO)_9$$
$$(OC_2H_4)_{29}OC_3H_6SiMeO]_{3.2}SiMe_3$$

with a viscosity of 6576 centistokes at 25° C.

EXAMPLE 5

Using the techniques disclosed in Example 3, the allyl diglycol started polycaprolactone composition prepared in Example 2 was capped with an acetoxy group to form a composition having the average formula:

$$CH_3CO(OC_5H_{10}CO)_{5.6}(OC_2H_4)_2OCH_2CH=CH_2$$

This composition was then reacted using the techniques disclosed in Example 4, with a silicone fluid having the average composition:

$$Me_3SiO(Me_2SiO)_{13}(HSiMeO)_{5.5}SiMe_3$$

to produce a siloxane-lactone block copolymer of the average composition:

$$Me_3SiO(Me_2SiO)_{13}[CH_3CO(OC_5H_{10}CO)_{5.6}(OC_2H_4)_2$$
$$O(CH_2)_3SiMeO]_{5.5}SiMe_3$$

EXAMPLE 6

Using the techniques disclosed in Example 1, propylene oxide and caprolactone were added to allyl alcohol to form a product having the average composition:

$$CH_2=CHCH_2O(C_3H_6O)_{15}(OCC_5H_{10}O)_{12}H$$

The resulting composition was then capped with an acetoxy group utilizing the techniques disclosed in Example 3, thereby producing a composition having the average formula:

$$CH_2=CHCH_2O(C_3H_6O)_{15}(OCC_5H_{10}O)_{12}OCCH_3$$

Using techniques disclosed in Example 4, this material was then reacted with silicone fluid having the average composition:

$$Me_3SiO(Me_2SiO)_{20}(MeHSiO)_{3.2}SiMe_3$$

to produce a siloxane-lactone block copolymer of the average composition:

$$Me_3SiO(Me_2SiO)_{20}[CH_3CO(OC_5H_{10}CO)_{12}(OC_3H_6)_{15}$$
$$O(CH_2)_3SiMeO]_{3.2}SiMe_3$$

EXAMPLE 7

Using the product of Example 4 as the only surfactant, an excellent $CO_2$-blown flexible polyurethane foam was prepared as hereinafter described. The following materials were employed in producing the foam.

| Material | Grams |
|---|---|
| Polyether-polyester polyol produced from propylene oxide and caprolactone in a 35–65 weight ratio employing glycerol as a starter having a hydroxyl number of 56 | 100.0 |
| Water | 4.0 |
| Surfactant of Example 4 | 1.50 |
| Triethylenediamine, 1 weight part in 2 weight parts dipropylene glycol | 0.3 |
| Stannous octoate | 0.15 |
| Tolylene diisocyanate, 80/20 isomers, 105 index | 51.0 |

The polyol was placed into a 500 milliliter stainless steel beaker and the surfactant was added followed by addition of the water and triethylenediamine. The resulting mixture was dispersed for 15 seconds at 2150 r.p.m. Then the stannous octoate was added and the resulting mixture was mixed for an additional 8 seconds. Thereafter the tolylene diisocyanate was added and the resulting mixture was mixed for an additional 7 seconds. The resulting mixture was then immediately poured into a 165 ounce tub and allowed to react and foam at ambient temperatures. After completion of the rise, the foam was postcured for 15 minutes in an oven at 130° C., then removed from the tub, cut in half vertically and evaluated. The rise of the foam was evaluated as 4.9 inches. On the average there were 35 to 40 cells per inch with only a slight to moderate amount of buckshot. It had a density of 2.17 pounds per cubic foot, a bottom collapse of only 0.1 inch, a top collapse of only 0.1 inch and a Nopco breatheability of 3.9. The foam was free of splits, was fine celled and was open celled. Overall quality was excellent.

What is claimed is:
1. A composition selected from the group consisting of:
(I) silanes having the average formula:

$$[R'O([CR^2_2]_5COO)_a(C_aH_{2a}O)_b(OC)_wR''']_xSiR^o_{4-x}$$

wherein R' is hydrogen, a monovalent hydrocarbon group free of aliphatic unsaturation and having 1 to 18 carbon atoms or an acyl group of the formula: R''C(O)— wherein R'' is hydrogen or a monovalent hydrocarbon group free of aliphatic unsaturation and having 1 to 18 carbon atoms, R''' is a divalent hydrocarbon group having 2 to 12 carbon atoms, the group $(OC_wR''')$ having 3 to 8 carbon atoms, R° is hydrogen, monovalent hydrocarbon groups free of aliphatic unsaturation and having 1 to 18 carbon atoms, alkoxy or an aryloxy group having no more than 18 carbon atoms; $R^2$ is hydrogen or a monovalent hydrocarbon group free of aliphatic unsaturation and having 1 to 18 carbon atoms (OC) is a carbonyl group, $w$ is an integer of 0 to 1; $a$ is an integer of 2 to 4; $b$ is an integer of 0 to 100; $c$ is an integer of 1 to 100; and $z$ is an integer of 1 to 4; and (II) siloxane-lactone block copolymers consisting essentially of at least one siloxane block containing at least two siloxane units represented by the formula:

$$R_dSiO_{\frac{4-d}{2}}$$

wherein R is hydrogen, a monovalent hydrocarbon radical having 1 to 18 carbon atoms or a divalent organic connecting group having 2 to 12 carbon atoms, and $d$ is 1 to 3, said siloxane block containing at least one of said siloxane units wherein at least one R is a divalent organic connecting group, said divalent organic connecting groups being composed of carbon and hydrogen or of carbon, hydrogen and oxygen and being bonded to silicon by a linkage selected from the class consisting of silicon to carbon bonds and silicon to oxygen to carbon bonds, and at least one lactone block containing at least one lactone group represented by the formula:

$$—[CR_2^2]_gCOO—$$

where $R^2$ has the above-defined meaning and $g$ is an integer of 5 to 6, said siloxane and lactone blocks being interconnected by said divalent connecting group.

2. A block copolymer as defined in claim 1 consisting essentially of:

(I) from 1 to 100 mol percent of siloxy units of the average formula:

$$[R'O([CR_2^2]_5COO)_a(C_aH_{2a}O)_b(OC)_wR''']_ySiO_{\frac{4-x-y}{2}}^{R_x} \quad (A)$$

(II) from 0 to 99 mol percent of siloxy units of the formula:

$$R_d^3SiO_{\frac{4-d}{2}} \quad (B)$$

wherein $x$ is an integer of 0 to 2, $y$ is an integer of of 1 to 3, $x+y$ is an integer of 1 to 3, $d$ is an integer of 0 to 3, R is hydrogen or a monovalent hydrocarbon group free of aliphatic unsaturation and having 1 to 18 carbon atoms, $R^3$ is hydrogen or a monovalent hydrocarbon group free of aliphatic unsaturation and having 1 to 18 carbon atoms and the remaining symbols are as defined in claim 1.

3. A block copolymer as claimed in claim 2 consisting of from 5 to 60 mol percent of siloxy units of Formula A and from 40 to 95 mol percent of siloxy units of Formula B between $R^2$ is hydrogen, $d$ is 2 to 3 and $x+y$ is 2.

4. A composition as claimed in claim 3 wherein $b$ is 0, $w$ is 0 and $c$ is at least 4.

5. A composition as claimed in claim 3 wherein $c$ is at least 4 and $(C_aH_{2a}O)_b$ is a divalent polyoxyethylene unit wherein $b$ is 2 to 100.

6. A composition as claimed in claim 3 wherein $c$ is at least 4 and $(C_aH_{2a})_b$ is a divalent polyoxyethylene-polyoxypropylene unit, $(C_2H_4O)_m(C_3H_6O)_n$, wherein $m$ is an integer of 1 to 99 and $n$ is an integer of 1 to 99 and $m+n$ equals $b$.

7. A composition as claimed in claim 3 wherein $c$ is at least 5, $x$ is 1, $y$ is 1, and $d$ is 2 to 3 and wherein said polymer has the formula:

$$R_2SiO[R_2SiO]_r[R'O([CH_2]_5COO)_c$$
$$(C_2H_4O)_bC_3H_6SiRO]_tSiR_3$$

wherein $r$ and $t$ are integers of sufficient value to provide 5 to 60 mol percent siloxy units of Formula A and 40 to 95 mol percent siloxy units of Formula B.

8. A composition as claimed in claim 7 wherein said polymer has the formula:

$$Me_3SiO[Me_2SiO]_r[CH_3COO([CH_2]_5$$
$$COO)_c(C_2H_4O)_bC_3H_6SiMeO]_tSiMe_3$$

wherein $r$ is 10 to 150, $t$ is 1 to 25, $b$ is 10 to 100 and $c$ is 4 to 50

9. A composition as claimed in claim 8 wherein $r$ is 20, $t$ is 3 to 4, $b$ is 29 to 30 and $c$ is 9 to 10.

10. A composition as claimed in claim 1 wherein said polycaprolactone silicon compound is a silane of the formula:

$$[CH_3COO([CH_2]_5COO)_c(C_2H_4O)_bC_3H_6]_zSi(OEt)_{4-z}$$

wherein the symbols are as defined in claim 1.

11. A composition as claimed in claim 10 wherein $c$ is at least 4 and $z$ is 1.

12. A composition as clamed in claim 10 wherein $b$ is 29 to 30, $c$ is 9 to 10 and $z$ is 1.

13. An aqueous solution containing 0.01 to 40 weight percent of the composition claimed in claim 2.

14. An aqueous solution containing 0.01 to 40 weight percent of the composition claimed in claim 6.

15. An aqueous solution containing 0.01 to 40 weight percent of the composition claimed in claim 8.

16. A process of making polycaprolactone silicone compounds selected from the class consisting of: (a) silanes having the average formula:

$$[R'O\ ([CR_2^2]_5COO)_c\ (C_aH_{2a}O)_b(OC)_wR''']_xSiR^{\circ}_{4-x}$$

wherein R' is hydrogen, a monovalent hydrocarbon group free of aliphatic unsaturation and having 1 to 18 carbon atoms or an acyl group of the formula: $R''C(O)—$ wherein R'' is hydrogen or a monovalent hydrocarbon group free of aliphatic unsaturation and having 1 to 18 carbon atoms, R''' is a divalent hydrocarbon group having 2 to 12 carbon atoms, the group $(OC)_wR'''$ having 3 to 8 carbon atoms, $R^{\circ}$ is hydrogen, monovalent hydrocarbon groups free of aliphatic unsaturation and having 1 to 18 carbon atoms, alkoxy or an aryloxy group having no more than 18 carbon atoms; $R^2$ is hydrogen or a monovalent hydrocarbon group free of aliphatic unsaturation and having 1 to 18 carbon atoms, (OC) is a carbonyl group, $w$ is an integer of 0 to 1; $a$ is an integer of 2 to 4; $b$ is an integer of 0 to 100; $c$ is an integer of 1 to 100; and $z$ is an integer of 1 to 4; and (b) block copolymers consisting essentially of:

(I) from 1 to 100 mol percent of siloxy units of the average formula:

$$[R'O([CR_2^2]_5COO)_c(C_aH_{2a}O)_b(OC)_wR''']_ySiO_{\frac{4-x-y}{2}}^{R_x} \quad (A)$$

(II) from 0 to 99 mol percent of siloxy units of the formula:

$$R_d^3SiO_{\frac{4-d}{2}} \quad (B)$$

wherein $x$ is an integer of 0 to 2, $y$ is an integer of 1 to 3, $x+y$ is an integer of 1 to 3, $d$ is an integer of 0 to 3, R is hydrogen or a monovalent hydrocarbon radical free of aliphatic unsaturation and having from 1 to 18 carbon atoms, $R^3$ is hydrogen or a monovalent hydrocarbon group free of aliphatic unsaturation and having 1 to 18 carbon atoms and the remaining symbols are as defined above, said process comprising reacting $c$ mols of a caprolactone of the formula $$\underbrace{O[CR_2^1H]_5CO}$$

$b$ mols of at least one alkylene oxide having 2 to 4 carbon atoms and one mol of a member from the class consisting of alkenols and alkenoic acids having 3 to 8 carbon atoms, to form a hydroxy-terminated polycaprolactone composition having the average formula HO([CR$^2$H]$_5$COO)$_c$(C$_a$H$_{2a}$O)$_b$(OC)$_w$Alkenyl wherein R$^2$, $a$, $b$, $c$ and $w$ are as defined above. Alkenyl is an alkenyl or cycloalkenyl group and the group (OC)$_w$Alkenyl has 3 to 8 carbon atoms; when R' is monovalent hydrocarbon or acyl as defined above, thereafter etherifying the terminal hydroxy group of said hydroxy-terminated polycaprolactone composition with a monovalent hydrocarbon group as defined above or an acyl group of the formula R''C(O)— as defined above; thereby resulting in a monoalkenyl polycaprolactone composition of the average formula:

R'O([CR$^2$H]$_5$COO)$_c$(C$_a$H$_{2a}$O)$_b$(OC)$_w$Alkenyl wherein R', R$^2$, (OC), Alkenyl, $a$, $b$, $c$ and $w$ are as defined above; thereafter reacting, in the presence of a platinum catalyst, a hydrosilicone from the class consisting of polysiloxanes containing 1 to 100 mol percent of hydrosiloxy units of the formula:

$$\frac{R_x}{H_ySiO_{\frac{4-x-y}{2}}}$$

and 0 to 99 mol percent of siloxy units of the formula:

$$R_dSiO_{\frac{4-d}{2}}$$

and silanes having the formula: H$_z$SiR°$_{4-z}$, wherein R, $d$, $x$ and $y$ are as defined above, with about 1 mol of said monoalkenyl polycaprolactone composition per mol of silicon bonded hydrogen of said hydrosilicone, to form said polycaprolactone silicone compounds as defined above.

17. Process as claimed in claim 16 wherein said polycaprolactone silicone compound has the formula:

R$_3$SiO[R$_2$SiO]$_r$[R'O([CH$_2$]$_5$COO)$_c$(C$_2$H$_4$O)$_b$C$_3$H$_6$SiRO]$_t$SiR$_3$ wherein $r$ and $t$ are integers of sufficient value to provide 5 to 60 mol percent siloxy units (A) and 40 to 95 mol percent siloxy units (B), said monoalkenyl polycaprolactone composition has the average formula R'O([CH$_2$]$_5$COO)$_c$(C$_2$H$_4$O)$_b$CH$_2$CH=CH$_2$ and said hydrosilicone has the formula R$_3$SiO[R$_2$SiO]$_r$[HSiRO]$_t$SiR$_3$ wherein $r$ and $t$ are as defined above.

18. Process as claimed in claim 17 wherein said polycaprolactone silicone compound has the formula:

Me$_3$SiO[Me$_2$SiO]$_r$[CH$_3$COO([CH$_2$]$_5$COO)$_c$(C$_2$H$_4$O)$_b$C$_3$H$_6$SiMeO]$_t$SiMe$_3$ wherein $r$ is 10 to 150, $t$ is 1 to 25, $b$ is 10 to 100 and $c$ is 1 to 50, said monoalkenyl polycaprolactone composition has the formula:

CH$_3$COO([CH$_2$]$_5$COO)$_c$(C$_2$H$_4$O)$_b$CH$_2$CH=CH$_2$ and said hydrosilicone has the formula Me$_3$SiO[Me$_2$SiO]$_r$[HSiMeO]$_t$SiMe$_3$ wherein $r$ is 10 to 150, $t$ is 1 to 25, $b$ is 10 to 100 and $c$ is 1 to 50.

References Cited
UNITED STATES PATENTS

| | | | |
|---|---|---|---|
| 2,963,500 | 12/1960 | Sommer | 260—448.2 B |
| 3,072,680 | 1/1963 | Starcher et al. | 260—448.2 B X |
| 3,288,842 | 11/1966 | Verdol | 260—448.2 B X |
| 3,395,167 | 7/1968 | Saam | 260—448.2 B |

DANIEL E. WYMAN, Primary Examiner

P. F. SHAVER, Assistant Examiner

U.S. Cl. X.R.

260—2.5 AM, 46.5 Y, 338.8 R, 448.2 E, 824 R, 825

UNITED STATES PATENT OFFICE
CERTIFICATE OF CORRECTION

Patent No. 3,778,458     Dated 12/11/73

Inventor(s) E. L. Morehouse

It is certified that error appears in the above-identified patent and that said Letters Patent are hereby corrected as shown below:

Col. 1, line 48, after "carbonyl", "groups" should be "group".

Col. 6, line 50, after "radicals", "contin" should be "contain".

Col. 6, line 71, after "The", "composition" should be "compositions".

Col. 7, line 40, so much of the formula as reads "$([CH_2]_5COO)_{26}$" should read "$([CH_2]_5COO)_{25}$". (Formula F, line 40).

Col. 12, line 53-54 after "such as", "diazoethane" should be "diazomethane".

Col. 18, line 67, the formula should be "$(OC)_w R'''$".

Col. 19, line 23, "where" should be "wherein".

Col. 19, line 34, so much of the formula as reads

"$([CR_2^2]_5COO)_a$"     should read     "$([CR_2^2]_5COO)_c$"

Col. 19, line 68-69 "c is at least 5" should be "c is at least 4".

Col. 19, line 70, so much of the formula as reads "$R_2SiO$" should read "$R_3SiO$".

Col. 20, line 18, "clamed" should be "claimed".

Signed and Sealed this thirteenth Day of April 1976

[SEAL]

Attest:

RUTH C. MASON
*Attesting Officer*

C. MARSHALL DANN
*Commissioner of Patents and Trademarks*